United States Patent [19]

Beatty et al.

[11] 4,378,228
[45] Mar. 29, 1983

[54] PROCESS FOR PREPARATION OF MONODISPERSED CRYSTALLINE PARTICLES FROM AMORPHOUS POLYMERS

[75] Inventors: Charles L. Beatty; John M. Pochan, both of Webster, N.Y.

[73] Assignee: Xerox Corporation, Stamford, Conn.

[21] Appl. No.: 784,216

[22] Filed: Apr. 4, 1977

[51] Int. Cl.$^3$ .............................................. B01D 9/00
[52] U.S. Cl. ................................... 23/300; 423/510; 524/611; 524/565; 524/601
[58] Field of Search ................. 23/295 R, 299, 300; 423/510; 260/707, DIG. 35; 524/601, 604, 605, 528, 611, 560, 567, 561, 582, 583, 585, 586, 587, 565, 361, 315, 378, 483

[56] References Cited

U.S. PATENT DOCUMENTS

| 3,432,514 | 3/1969 | Cash et al. | 260/88.2 |
| 3,931,082 | 1/1976 | Cruz et al. | 528/490 |
| 4,289,874 | 9/1981 | Bockrath | 524/601 |

OTHER PUBLICATIONS

Journal of Applied Polymer Science, V26 1795–1811, 1981, Jameel.
Translation of p. 411–414, V16 No. 6 of Slvtskin et al. Zhvrnal Navchnoi i prikladnoi fotogratii i kinematogratii.
Zingaro et al. Selenium Van Nostrand Reinhold 10 N.Y. pp. 125–133, 1974.
Saunder J. Phys. Chem. 4, 423 (1900), pp. 462–469.

Primary Examiner—Hiram H. Bernstein
Attorney, Agent, or Firm—Peter H. Kondo; Raymond C. Loyer; John E. Beck

[57] ABSTRACT

Process for preparation of monodispersed crystalline particles from amorphous crystallizable polymers. In this process, an amorphous polymer of an inorganic glass, such as selenium, or of organic polymer, such as a polyester, is initially contacted with a crystal inducing fluid under certain specified conditions. Concurrent with such contact the crystallizable polymer is subjected to physical and/or ultrasonic forces. This combination of steps results in the substantially complete conversion of the amorphous polymer to monodispersed crystalline particles. In the case of crystallization of amorphous selenium, this process is directive for preparation of the corresponding triclinic crystalline form of this material.

26 Claims, No Drawings

PROCESS FOR PREPARATION OF MONODISPERSED CRYSTALLINE PARTICLES FROM AMORPHOUS POLYMERS

BACKGROUND OF THE INVENTION

1. Field of the Invention

This invention relates to a process. More specifically, this invention is directed to solvent induced crystallization (SINC) of amorphous crystallizable polymers.

2. Description of the Invention

As is well known in the art, crystallization of polymers can be achieved by anyone of several processes. One such process which is of primary industrial importance involves thermal induced crystallization of polymeric materials either from the melt or from the glassy phase. Strain induced crystallization, also employed commercially, provides an alternative to the thermal treatment described hereinabove.

Another method of achieving crystal formation in polymers is by induction with appropriate solvents. This is termed solvent induced crystallization (hereinafter, SINC) or liquid induced crystallization. The occurrence of this phenomenon has been known for a considerable time and a number of studies have dealt in detail with several aspects of the so called SINC process. The most recent literature on this topic has involved the study of solvent induced crystallization of polyethylene terephthalate (PET); although earlier investigations also considered the action of solvents on cellulose triacetate and cellulose tributyrate. The effect on polycarbonates has also been previously noted. These early investigations show qualitatively (by means of X-ray diffraction patterns) that solvents are capable of interacting with these polymers and thereby increasing their crystallinity. It has also been illustrated that the nature of the solvent relative to the polymer is an important criterion, since different solvents effect the polymer to varying degrees.

The crystallization of amorphous selenium has been extensively studied and the factors effecting such physical transformation carefully documented, "Selenium", R. A. Zingaro and W. C. Cooper (Eds), Van Nostrand Reinhold Company, 1974 New York, Chapter 3, pp 125–133. It is known, for example, that certain solvents can induce crystallization upon heating with amorphous selenium and that a solvent may be directive for conversion of this amorphous metal to a particular crystalline form, A. P. Saunders J. Phys. Chem. 4, 423 (1900). Even exposure of amorphous selenium to water vapor can induce its conversion to the trigonal crystalline form, Y. S. Chiang, and J. K. Johnson, J. Appl. Phys. 38, 1647 (1967).

In its simplest terms, the process of solvent induced crystallization may be considered as involving the following steps: the solvent is imbibed into or just below the surface of the polymer by diffusion; the solvent polymer interaction causes enhanced mobility of the polymeric segments by interrupting the intersegmental forces; and, if the polymer solvent interaction is strong enough, the polymeric macromolecules rearrange themselves into a more thermodynamically lower energy state—generally the crystalline state. Thus, those solvents which are capable of sufficient interaction with a given polymer may be suspected to induce crystallization without dissolution of the polymer. Clearly, if segmental mobility is favored, (as compared to the dispersion, polar, and hydrogen bonding forces holding the macromolecules together), solvent exposure may lead to complete dissolution of the polymer. Typically, some dissolution will in fact occur at the interface between the pure solvent and the polymer sample due to the large concentration gradient.

The advantages of using solvent induced crystallization, as opposed to thermally induced crystallization, resides primarily in the achievement of crystallization at reduced temperatures. Moreover, in the case of solvent induced crystallization, the solvent-polymer interactions may differ in degree from solvent to solvent thus enabling greater control and variation in the process parameters. It is anticipated that at a fixed temperature, the morphology and final properties of crystallized polymer particles can be readily manipulated by the choice of a particular solvent.

The phenomenological processes involved in solvent induced crystallization appear to lie somewhere in between crystallization from solution and thermal induced crystallization processes. Some researchers regard solvent induced crystallization as resulting from a partial or localized dissolution of the polymer to form a concentrated solution followed by later crystallization of the polymer and ejection of the solvent from the crystal lattice. It is believed that the parameters which are of prime importance in solvent induced crystallization processes involve the intrinsic properties of the polymer, the nature of the solvent employed, the temperature of crystallization relative to the $T_g$ of the polymer, the kinetics of crystallization and the kinetics of solvent diffusion into the polymer. Depending upon how these variables are adjusted and combined, the resultant materials will possess different morphological textures and different material properties.

Most of the techniques disclosed in a literature regarding solvent induced crystallization simply involve immersion of a polymeric sample into a solvent and allowing the sample to remain in the solvent for a prescribed period of time. At the end of this processing sequence, the sample is withdrawn from the solvent, generally dried and the crystalline materials evaluated, see Desai and Wilkes, J. Polymer Sci.: Symposium No. 46, 291–319 (1974) John Wiley and Sons, New York City. As is readily apparent, the techniques employed in the prior art systems which involve solvent induced crystallization are self limiting; that is, as crystal growth occurs on the polymer surface, diffusion of the solvent into the polymer is inhibited. Thus, solvent induced crystallization, as practiced by the prior art, is inefficient and not readily capable of complete conversion of polymer samples to their corresponding crystalline form.

Accordingly, it is the object of this invention to remedy the above as well as related deficiencies in the prior art.

More specifically, it is the primary object of this invention to provide a process for the rapid and efficient conversion of amorphous inorganic and organic polymers to monodispersed crystalline particles.

It is another object of this invention to provide a process for substantially complete conversion of amorphous selenium to the corresponding polymeric, triclinic crystalline form in a rapid and efficient manner.

SUMMARY OF THE INVENTION

The above and related objects are achieved by providing a process wherein a sample comprising an amorphous crystallizable polymer is contacted with a crystal inducing fluid, thereby causing the formation of crystalline particles on the surface of the polymer exposed to said solvent. Concurrent with or subsequent to the formation of the crystalline particles, said particles are subjected to mechanical and/or ultrasonic forces thereby resulting in (a) their removal from the surface of the amorphous polymer; (b) their fragmentation to monodispersed particles, and; (c) the re-exposure of the amorphous polymer sample to the crystal inducing fluid. The rate of attrition of the crystals from the amorphous polymer must be approximately comparable to or greater than the rate of crystalline particle formation on said surface. This process can proceed until substantially all of the amorphous polymer has been crystallized.

In the preferred embodiments of this process, the polymer comprises amorphous selenium. This amorphous polymer can also contain one or more adventicious impurities or such impurities can be present in the crystal inducing fluid. These impurities may assist in the crystallization process, however, they are of prime importance in the modification of the photoelectric properties of the resultant product. This process is directive for the crystallization of amorphous selenium to the triclinic crystalline form.

DESCRIPTION OF THE INVENTION INCLUDING PREFERRED EMBODIMENTS

The amorphous polymers which are suitable for use in this invention include virtually any inorganic or organic polymeric material capable of solvent and/or thermally induced crystallization. These amorphous polymers can be substantially pure or contain any one of a variety of adventitious impurity. In the case of selenium such impurities are chosen for their enhancement in the photo-electric properties and xerographic properties of the corresponding crystalline material. The impurities most commonly used in modification of the photoelectric properties of selenium are the halogens (generally present in a concentration of less than 100 ppm). Alloys of amorphous selenium can also be converted to monodispersed crystalline particles by the process of this invention. An alloy of selenium useful in this process will typically contain in excess of 50 percent by weight selenium and preferably in excess of 60 percent by weight selenium. As is well known, selenium can be readily alloyed with tellurium, sulphur and arsenic.

The presence of the above ingredients within the amorphous selenium can also be expected to alter the rate of formation of nucleation centers on the surface of the amorphous polymer and/or the growth rate of crystals at such nucleation sites. Adventitious impurities such as chlorine will enhance the rate of crystallization whereas the presence of alloying elements, such as arsenic, will retard crystallization of the polymer.

The crystalline material prepared according to this process comprises essentially monodispersed particles which can have a particle size in the range of from about 0.5 to about 20 microns. Theoretically, a "monodispersed" particle distribution is descriptive of a crystalline mixture wherein all particles within the mixture are of essentially the same size. It is hypothesized that a symmetrical Gaussian shaped distribution of particles can be characterized in terms of the variation of particle size from the idealized monodispersed case in the manner analogous to calculation of molecular weight distribution. That is the ratio of the 1st and 2nd moments yield a measure of deviation from polydispersity.

For example:

$$\overline{D}_{1st} \text{ moment} = \frac{\Sigma_i NiDi}{\Sigma_i Ni}$$

$$\overline{D}_{2nd} \text{ moment} = \frac{\Sigma_i NiDi^2}{\Sigma_i NiDi}$$

(D = diameter of each particle, N = number of particles).

In the ideal monodispersed case, the ratio of $$\frac{\overline{D}_{2nd}}{\overline{D}_{1st}} = 1.0$$

For a symmetrical Gaussian distribution $$1.0 < \frac{\overline{D}_{2nd}}{\overline{D}_{1st}} \infty$$

Extending the analogy of molecular weight distribution determinations to the particle size distribution determination of the lubricious addition, when the particle size distribution of lubricant crystals is the range of from about 1 to about 2, such crystals shall be regarded as essentially the same size (and thus characterized as "monodispersed").

The organic polymers suitable for use in this process include virtually all crystallizable, thermoplastic polymers. The following are representative of these organic polymers and include the poly(olefins), the vinyls (e.g. tactic polystyrene), the polyesters (e.g. poly(ethyleneterephthalate)), the acrylics (e.g. tactic poly(methylmethacrylate)), the poly(ethers) (e.g. poly(2,6-dimethyl phenylene oxide), the poly(acrylonitriles) and the polycarbonates (e.g. Bis-phenol-A-polycarbonates).

These organic polymers can be homopolymers, copolymerized with other organic or inorganic materials or exist as blends with other organic or inorganic materials. The presence of such other materials can also, as in the case of selenium, modify their rate of crystallization and may, in certain instances, result in enhancement of one or more of the inherent properties of the corresponding crystalline form of said polymers. In one of the preferred embodiments of this invention, the organic polymer is processed with a crystal inducing fluid which contains a colorant.

The crystal inducing fluid used in this process is typically a non-solvent for the amorphous polymers and preferably utilized in this process in the liquid phase. Of course, the characterization of a fluid as a "non-solvent" is descriptive of the relationship of that fluid to the polymer in the environment of this process. The fact that this relationship can possibly be altered when operating outside the parameters of this process is not inconsistent with the characterization of these fluids as "non-solvents". Representative of crystal inducing fluids suitable for use in the crystallization of amorphous selenium include water, solutions of water and other miscible fluids. Of course, such miscible fluids should also be essentially non-solvents for the amorphous selenium. The crystal inducing fluids suitable for use in the crystallization of the organic polymers are acetone, ethyl acetate, hexane diethyl ether, ketones, chlorinated hydrocarbons, alcohols, phenols, diols, glycol ethers and α-pinene.

The amorphous polymer and the crystal inducing solvent can be intimately contacted with one another by simply combining the two in a ball mill. The mill can also contain an abrasive medium such as stainless steel shot or inert particulates. The contents of the mill are heated at least to the glass transition temperature $T_g$ of the amorphous polymer or preferably to temperatures in excess of this value (however, less than the $T_m$ of polymer). The glass transition temperature ($T_g$) of these polymers is defined, for the purpose of this invention, as the temperature at which at least some of the amorphous polymer undergoes a transition from a glassy phase to the rubbery phase. The melting point temperature ($T_m$) of these polymers is defined, for the purpose of this invention, as that point at which the step change increase in volume of the crystalline phase of the polymer (caused by increasing temperature) occurs. Both of these transitions, $T_g$ and $T_m$, can be conveniently observed by conventional dilatometric measurements of volume as a function of temperature. Alternatively, such transitions can be determined by standard differential scanning calorimetry. Both of these techniques should provide good agreement as to the values of $T_g$ and $T_m$. It should be noted that some of the amorphous polymers have $T_g$'s below room temperature and in addition that the extent of conversion from the glassy to the phase is generally less than total. Thus, the crystalline polymer can also contain some amorphous material interspersed between the crystallites of the dominant crystalline phase.

Concurrent with such heating, the contents of the mill are tumbled so as to cause attrition of the monodispersed crystalline particles from the surface of the amorphous polymer. The rate of attrition must be approximately comparable to the rate of crystal growth on the surface of the amorphous polymer. The failure to abide by this parameter will defeat the primary objective of this invention; namely, the exclusive preparation of monodispersed crystalline, particles. Attrition of the crystalline particle can also be readily achieved by other equivalent techniques (e.g. ultrasonic vibration).

The process of this invention also provides a convenient method for introducing adventitious impurities into the crystalline particles formed during such crystallization. For example, triclinic selenium crystals can be readily doped with chloride ($Cl^-$) by introducing a source of this anion into the crystal inducing fluid, either prior to or concurrent, with the contact of such fluid with the amorphous selenium. Similarly, alloys of selenium and materials such as arsenic can be formed by simply adding a source of the arsenic or arsenous cation into the crystal inducing fluid at the appropriate point in time.

Other variations of this process include contacting the amorphous polymer with the vapor phase of the crystal inducing fluid under conditions which would preclude condensation of the fluid on the polymer. Still other variations of this process involve carrying out this process at either super or subatmospheric pressure, depending upon the boiling point of the crystal inducing fluid and the phase transition temperatures ($T_g$ and $T_m$) of the amorphous polymer.

The Examples which follow further define, describe and illustrate certain of the preferred embodiments of this invention. Apparatus and techniques employed in such Examples are standard or as hereinabove described. Parts and percentages appearing in such Examples are by weight unless otherwise stipulated.

EXAMPLE I

Preparation of the triclinic crystalline form of selenium—about 20 grams of amorphous selenium (xerographic grade) is introduced into a ball mill together with 100 mls. of distilled water, 0.2 mls. of 1 N hydrochloric acid and approximately 1,000, 3/16 inch diameter stainless steel shot. The contents of the mill are heated and maintained at approximately 55° C. and milled for 3½ days. The resultant slurry is washed and the stainless steel balls removed by filtration. The black powder which is recovered is dried and subjected to X-ray diffraction analysis. Such analysis indicates that the powder thus produced is 100% triclinic selenium crystals.

EXAMPLE II

The procedures of Example I are repeated except that the contents of the mill are heated to 95° C. and milled for approximately 67 hours. The results are essentially identical to that of Example I.

EXAMPLE III

Approximately 30 grams of xerographic grade amorphous selenium and 150 mls. tap water are placed in a sealed container and thereafter subjected to vigorous agitation on a paint shaker for two hours. The resultant crystalline material which is recovered from the shaker is essentially pure triclinic selenium.

EXAMPLE IV

The procedures of Example III are repeated except that the sealed container is placed in an ultrasonic device for approximately 12 hours. The crystalline material which is recovered from the container is essential pure triclinic selenium.

Scanning electron microscopic analysis of all the samples produced in the above examples show them to be triclinic selenium particles having a particle size of 20 microns or less.

EXAMPLE V

The procedures of Example I are repeated except for the substitution of 5 mls. of a saturated solution of arsenic tribromide for the hydrochloric acid in the solvent inducing fluid. The triclinic crystalline material thus produced contains arsenic.

EXAMPLE VI

The triclinic crystalline selenium produced in Examples I-V is evaluated for its electrophotographic response by dispersing these materials in a binder and fabricating an electrophotographic imaging member of the type described in U.S. Pat. No. 3,725,058 (which is hereby incorporated by reference in its entirety).

The electrophotographic speed of the imaging members prepared with the arsenic (Example V) and chloride (Example I) containing triclinic crystalline selenium are superior to those prepared with undoped materials.

EXAMPLE VII

A 5 mil. thick sheet of Lexan 141 (a Bis-phenol-A-polycarbonate available from the General Electric Company) is immersed in ethylacetate at room temperature. The vessel containing the sheet of Lexan and the ethylacetate is placed in an ultrasonic chamber and subjected to sonic attrition for approximately 5 minutes. The sheet of Lexan is withdrawn from the fluid and the crystalline particles remaining in the vessel recovered by filtration.

EXAMPLE VIII

The procedures of Example VII are repeated except for the addition of 10 parts by weight carbon black to the dispersion of polymer in the crystal inducing solvent. The crystalline particles which are recovered subsequent to completion of the crystallization process have carbon black incorporated within their crystal structure. The carbon black, in addition to imparting color to these particles, is also believed to assist in their crystallization by providing nucleation sites upon which polymer crystals can grow.

What is claimed is:

1. A process comprising:
   (a) contacting a sample comprising amorphous selenium with a crystal inducing fluid at temperatures in excess of the $T_g$ but below the $T_m$ of the sample, thereby promoting triclinic crystal formation on the surface of said sample; and
   (b) subjecting said sample to attrition concurrent with step (a), whereby said triclinic crystals are removed from the surface of said sample and fragmented to monodispersed particles, the rate of removal of crystalline particles from the surface of the sample being approximately equivalent to or greater than the rate of crystal formation on said sample.

2. The process of claim 1, wherein the attrition of triclinic crystals from the sample surface and their fragmentation to monodispersed particles is achieved by ball milling.

3. The process of claim 1, wherein the attrition of triclinic crystals from the sample surface and their fragmentation to monodispersed particles is achieved by ultrasonic vibration.

4. The process of claim 1, wherein the crystal inducing fluid is water.

5. The process of claim 4, wherein the process is carried out under superatmospheric pressures at temperatures in excess of the boiling point of the water.

6. The process of claim 4, wherein the water is utilized in said process in the form of steam.

7. The process of claim 1, wherein the sample of amorphous selenium contains adventitious impurities.

8. The process of claim 1, wherein the sample is an alloy of amorphous selenium and arsenic, the selenium being present in a concentration in excess of 50 percent by weight.

9. The process of claim 1, wherein the sample consists essentially of amorphous selenium.

10. The process of claim 1, wherein the crystal inducing fluid contains adventitious impurities.

11. The process of claim 1, wherein the crystal inducing fluid contains cations capable of forming alloys with the triclinic crystals.

12. A process comprising:
    (a) contacting a sample comprising amorphous, crystallizable inorganic polymer with a crystal inducing fluid at temperatures in excess of the $T_g$ but below the $T_m$ of the polymer, thereby promoting crystal formation on the surface of said polymer; and
    (b) subjecting said sample to attrition concurrent with step (a), whereby said crystals are removed from the surface of said sample and fragmented to monodispersed particles, the rate of removal of crystalline particles from the surface of the sample being approximately equivalent to or greater than the rate of crystal formation of said sample.

13. The process of claim 12, wherein the attrition of crystalline particles from the surface of the sample and their fragmentation to monodispersed particles is achieved by ball milling.

14. The process of claim 12, wherein the attrition of crystalline particles from the surface of the sample and their fragmentation to monodispersed particles is achieved by ultrasonic vibration.

15. The process of claim 12, wherein the crystal inducing fluid is water.

16. The process of claim 15, wherein the process is carried out under superatmospheric pressures at temperatures in excess of the boiling point of water.

17. The process of claim 15 wherein the water is utilized in said process in the form of steam.

18. The process of claim 12 wherein the sample comprises amorphous selenium and adventitious impurities.

19. The process of claim 12 wherein the sample comprises an alloy of amorphous selenium and arsenic, the selenium being present in a concentration in excess of 50 percent by weight.

20. The process of claim 12 wherein the sample consists essentially of amorphous selenium.

21. The process of claim 12 wherein the crystal inducing fluid contains adventitious impurities.

22. A process comprising:
    (a) contacting a sample comprising amorphous, crystallizable organic polymer selected from the group consisting of vinyl polymer, poly(olefin) polymer and poly(ether) polymer with a crystal inducing fluid at temperatures in excess of the $T_g$ but below the $T_m$ of the polymer, thereby promoting crystal formation on the surface of said polymer; and
    (b) subjecting said sample to attrition concurrent with step (a), whereby said crystals are removed from the surface of said sample and fragmented to monodispersed particles, the rate of removal of crystalline particles from the surface of the sample being approximately equivalent to or greater than the rate of crystal formation of said sample.

23. The process of claim 22 wherein the crystal inducing fluid contains a colorant.

24. The process of claim 22 wherein the crystallizable organic polymer is a blend containing at least one crystallizable polymer.

25. The process of claim 22 wherein the crystallizable organic polymer is a copolymer containing at least one crystallizable polymer.

26. The process of claim 22 wherein the sample comprises a polymer mixture containing at least one crystallizable polymer.

* * * * *